(12) United States Patent
Cheng et al.

(10) Patent No.: US 10,097,079 B1
(45) Date of Patent: Oct. 9, 2018

(54) DUAL CONSTANT TIME SWITCHING REGULATOR AND SWITCHING CONTROL CIRCUIT AND METHOD THEREOF

(71) Applicant: RICHTEK TECHNOLOGY CORPORATION, Zhubei, HsinChu (TW)

(72) Inventors: Hung-Yu Cheng, Taipei (TW); Kuo-Chun Wu, Nantou (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 15/883,867

(22) Filed: Jan. 30, 2018

(30) Foreign Application Priority Data

Jul. 31, 2017 (CN) .......................... 2017 1 0638973

(51) Int. Cl.
| | |
|---|---|
| *G05F 1/00* | (2006.01) |
| *H02M 1/14* | (2006.01) |
| *H02M 1/088* | (2006.01) |
| *H02M 3/158* | (2006.01) |
| *H02M 1/00* | (2006.01) |

(52) U.S. Cl.
CPC .............. *H02M 1/14* (2013.01); *H02M 1/088* (2013.01); *H02M 3/158* (2013.01); *H02M 2001/0029* (2013.01)

(58) Field of Classification Search
CPC .. H02M 3/158; H02M 3/1588; H02M 3/1582; H02M 2001/0045; H02M 2001/0067
See application file for complete search history.

(56) References Cited

U.S. PATENT DOCUMENTS

2016/0070281 A1* 3/2016 Cheng .................. H02M 3/156
323/273

* cited by examiner

*Primary Examiner* — Adolf Berhane
*Assistant Examiner* — Afework Demisse
(74) *Attorney, Agent, or Firm* — Tung & Associates

(57) ABSTRACT

A dual constant time switching regulator includes: a power circuit including an inductor and at least a power switch for converting an input power to an output power, and a switching control circuit for generating a switch control signal to control the power switch, wherein the switching control circuit includes a comparison circuit for comparing an error amplified signal and a triangle wave signal to generate a comparison result, and a time determining circuit for generating the switch control signal according to the comparison result, wherein after the power switch turns ON, it keeps ON for at least a minimum ON time until the triangle wave signal is higher than the error amplified signal, and wherein after the power switch turns OFF, it keeps OFF for at least a minimum OFF time and until the triangle wave signal is lower than the error amplified signal.

13 Claims, 9 Drawing Sheets

DUAL CONSTANT TIME SWITCHING REGULATOR AND SWITCHING CONTROL CIRCUIT AND METHOD THEREOF

CROSS REFERENCE

The present invention claims priority to CN201710638973.1, filed on Jul. 31, 2017.

BACKGROUND OF THE INVENTION

Field of Invention

The present invention relates to a constant time switching regulator; particularly, it relates to a switching regulator with two sets of constant time. The present invention also relates to a switching control circuit and a control method of a switching regulator.

Description of Related Art

FIG. 1A shows a prior art constant time switching regulator (switching regulator 1A). The switching regulator 1A comprises a buck power circuit 10 which includes an inductor L and power switches S1 and S2, and a control circuit 50. The control circuit 50 controls the power switches S1 and S2 to convert an input voltage VIN to an output voltage VO. In the control circuit 50, an error amplifier 51 compares a feedback signal FB (which relates to the output voltage VO) with a reference voltage VR to generate an error amplified signal EAO. APWM (Pulse Width Modulation) comparator 55 compares the error amplified signal EAO with a ramp signal RMP to generate a comparison result CPO. A latch circuit 55 generates a switch control signal which includes G1 and G2 to control the power switches S1 and S2 respectively according to the comparison result CPO and a constant time generator 58. Waveforms of the error amplified signal EAO, the ramp signal RMP, and a voltage VLX on a common node among the inductor L and the power switches S1 and S2 are shown in FIG. 1B. When the error amplified signal EAO is larger than the ramp signal RMP, the control circuit 50 controls the power switch S1 to be ON for a constant time TON, and controls the power switch S1 to be OFF after the constant time TON, wherein the power switch S2 operates substantially in opposite phase of the power switch S1.

A drawback of the prior art shown in FIG. 1A is that: since the ON time is constant and a minimum OFF time is required, the maximum rising slope of the inductor current ILD is limited by the constant ON time TON and the minimum OFF time, and therefore during fast load transient, a large voltage drop will occur on the output voltage VO. Besides, because the ON time is constant and the minimum OFF time is required, the duty cycle is limited and cannot be adjusted to a higher ratio (for example close to 100%); therefore, when the input voltage VIN is close to the output voltage VO during buck power conversion, the power switches S1 and S2 have to switch by a high switching frequency, causing large ripple in the output voltage and unstable output performance.

FIG. 2 shows a minimum constant time switching buck regulator (switching regulator 2). The ON time is extensible in the switching regulator 2 through a VOS pin which is directly connected to the output voltage of the switching regulator for loop compensation. However, in an integrated PMIC (Power Management Integrated Circuit) which controls multiple switching regulators, one VOS pin is required for each switching regulator, which increases the cost and the complexity of the PCB layout.

Compared to the prior art in FIG. 1A, the present invention is advantageous in that the ON time is adaptively extensible, whereby the duty cycle can be extended and the load response is better. When the input voltage VIN is close to the output voltage VO during buck power conversion, since the duty cycle according to the present invention can be adaptively and seamlessly extended to a higher ratio, for example close to 100%, the switching regulator of the present invention can operate with wider input voltage range while having lower ripples. Besides, compared to the prior art in FIG. 2, the present invention does not need an extra pin since the compensation network can be internal to the integrated circuit; hence, the cost and complexity of the PCB layout are lower.

SUMMARY OF THE INVENTION

From one perspective, the present invention provides a dual constant time switching regulator, comprising: a power circuit, which includes an inductor and at least a power switch, configured to operably convert an input voltage to an output voltage; and a switching control circuit, configured to operably generate a switch control signal according to a signal related to the output voltage (an output voltage related signal) to control the power switch, including: a comparison circuit, configured to operably compare a first input signal and a second input signal to generate a comparison result, wherein the first input signal and the second input signal are one of the following combinations: (1) the first input signal is a triangle wave signal, and the second input signal is an error amplified signal; or (2) the first input signal is the output voltage related signal, and the second input signal is a reference voltage; and a time determining circuit, configured to operably generate the switch control signal according to the comparison result, wherein the power switch keeps ON for at least a minimum ON time after the power switch is turned ON, and after the minimum ON time finishes, the power switch keeps ON until a level of the first input signal is higher than a level of the second input signal, and at this time point the power switch is turned OFF, wherein the power switch keeps OFF for at least a minimum OFF time after the power switch is turned OFF, and after the minimum OFF time finishes, the power switch keeps OFF until the level of the first input signal is lower than the level of the second input signal, and at this time point the power switch is turned ON.

In one embodiment, the time determining circuit includes: a minimum ON time generator circuit, configured to operably generate a minimum ON control signal according to the comparison result and a minimum OFF control signal, wherein the minimum ON control signal determines the minimum ON time; a minimum OFF time generator circuit, configured to operably generate a minimum OFF control signal according to the comparison result and the minimum ON control signal, wherein the minimum OFF control signal determines the minimum OFF time; and a state control circuit, configured to operably generate the switch control signal according to the minimum ON control signal and the minimum OFF control signal.

In one embodiment, the switching control circuit further includes: a triangle wave generator circuit, configured to operably generate the triangle wave signal; and an error amplifier circuit, configured to operably generate the error amplified signal according to a difference of the output voltage related signal and a reference voltage.

In one embodiment, the triangle wave signal is a full triangle wave.

In one embodiment, the triangle wave generator circuit generates the triangle wave signal according to the switch control signal and/or an output current related signal.

From another perspective, the present invention provides a switching control circuit, configured to operably control a dual constant time switching regulator, wherein the dual constant time switching regulator comprises a power circuit and the switching control circuit, the power circuit including an inductor and at least a power switch and is configured to operably convert an input voltage to an output voltage; the switching control circuit being configured to operably generate a switch control signal according to a signal related to the output voltage (an output voltage related signal) to control the power switch, and the switching control circuit including: a comparison circuit, configured to operably compare a first input signal and a second input signal to generate a comparison result, wherein the first input signal and the second input signal are one of the following combinations: (1) the first input signal is a triangle wave signal, and the second input signal is an error amplified signal; or (2) the first input signal is the output voltage related signal, and the second input signal is a reference voltage; and a time determining circuit, configured to operably generate the switch control signal according to the comparison result, wherein the power switch keeps ON for at least a minimum ON time after the power switch is turned ON, and after the minimum ON time finishes, the power switch keeps ON until the level of the first input signal is higher than the level of the second input signal, and at this time point the power switch is turned OFF, wherein the power switch keeps OFF for at least a minimum OFF time after the power switch is turned OFF, and after the minimum OFF time finishes, the power switch keeps OFF until the level of the first input signal is lower than the level of the second input signal, and at this time point the power switch is turned ON.

In one embodiment, the time determining circuit includes: a minimum ON time generator circuit, configured to operably generate a minimum ON control signal according to the comparison result and a minimum OFF control signal, wherein the minimum ON control signal determines the minimum ON time; a minimum OFF time generator circuit, configured to operably generate a minimum OFF control signal according to the comparison result and the minimum ON control signal, wherein the minimum OFF control signal determines the minimum OFF time; and a state control circuit, configured to operably generate the switch control signal according to the minimum ON control signal and the minimum OFF control signal.

From another perspective, the present invention provides a method for controlling a dual constant time switching regulator, wherein the dual constant time switching regulator comprises a power circuit which includes an inductor and at least a power switch and is configured to operably convert an input voltage to an output voltage; the method including: comparing a first input signal and a second input signal to generate a comparison result, wherein the first input signal and the second input signal are one of the following combinations: (1) the first input signal is a triangle wave signal, and the second input signal is an error amplified signal; or (2) the first input signal is the output voltage related signal, and the second input signal is a reference voltage; and generating a switch control signal according to the comparison result to control the power switch, wherein the power switch keeps ON for at least a minimum ON time after the power switch is turned ON, and after the minimum ON time finishes, the power switch keeps ON until the level of the first input signal is higher than the level of the second input signal, and at this time point the power switch is turned OFF, wherein the power switch keeps OFF for at least a minimum OFF time after the power switch is turned OFF, and after the minimum OFF time finishes, the power switch keeps OFF until the level of the first input signal is lower than the level of the second input signal, and at this time point the power switch is turned ON.

In one embodiment, the step of generating the triangle wave includes: generating the triangle wave signal according to the switch control signal and/or an output current related signal.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1A:
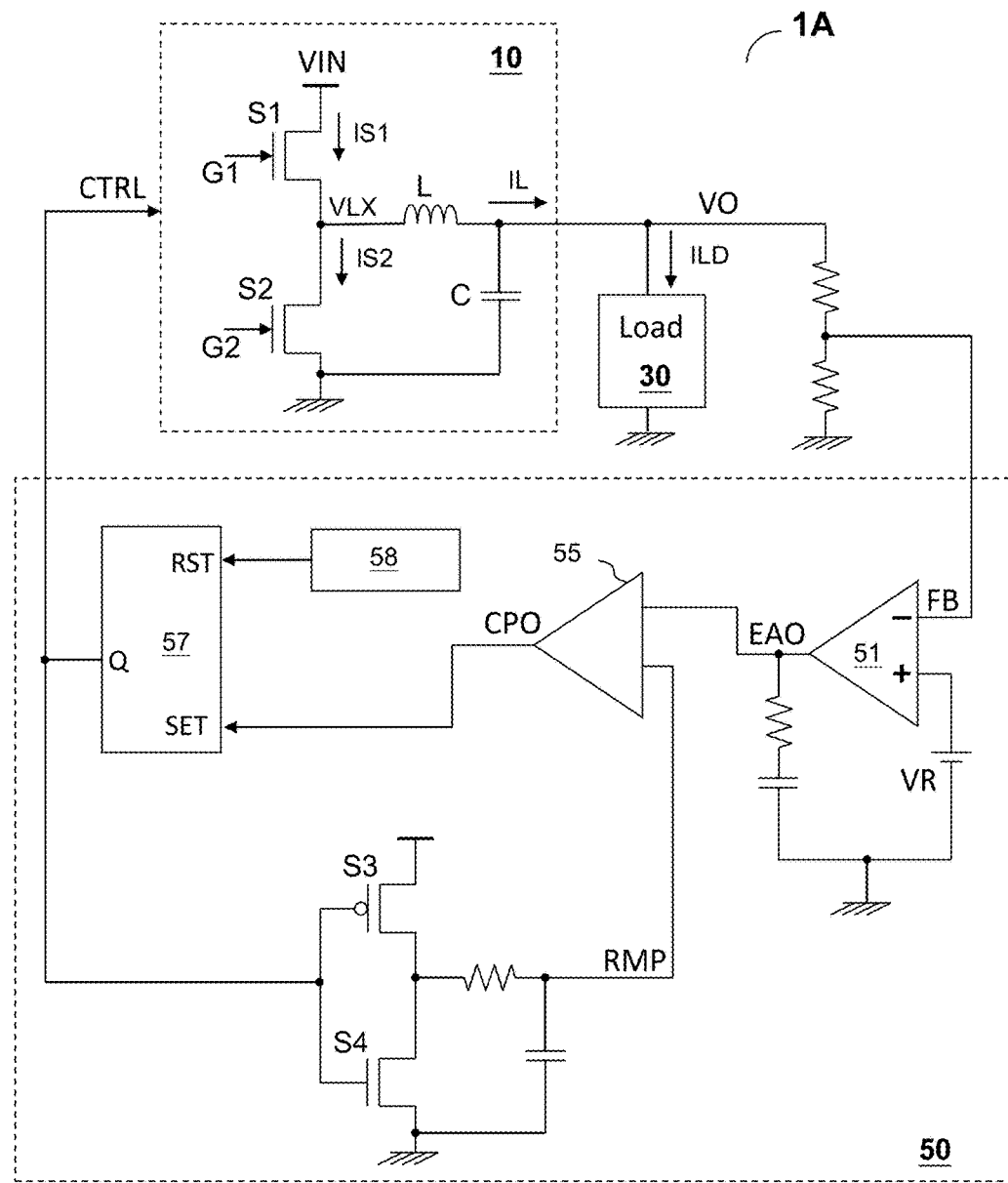
FIG. 1A shows a schematic diagram of a prior art constant time switching regulator.
Figure 1B:
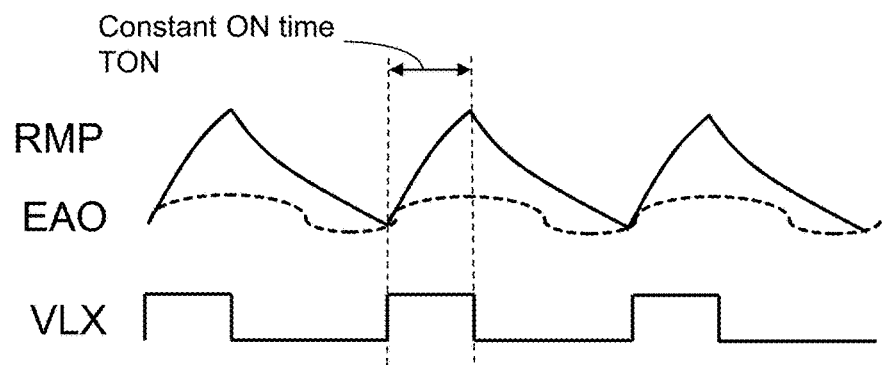
FIG. 1B shows signal waveforms corresponding to the circuits shown in FIG. 1A.
Figure 2:
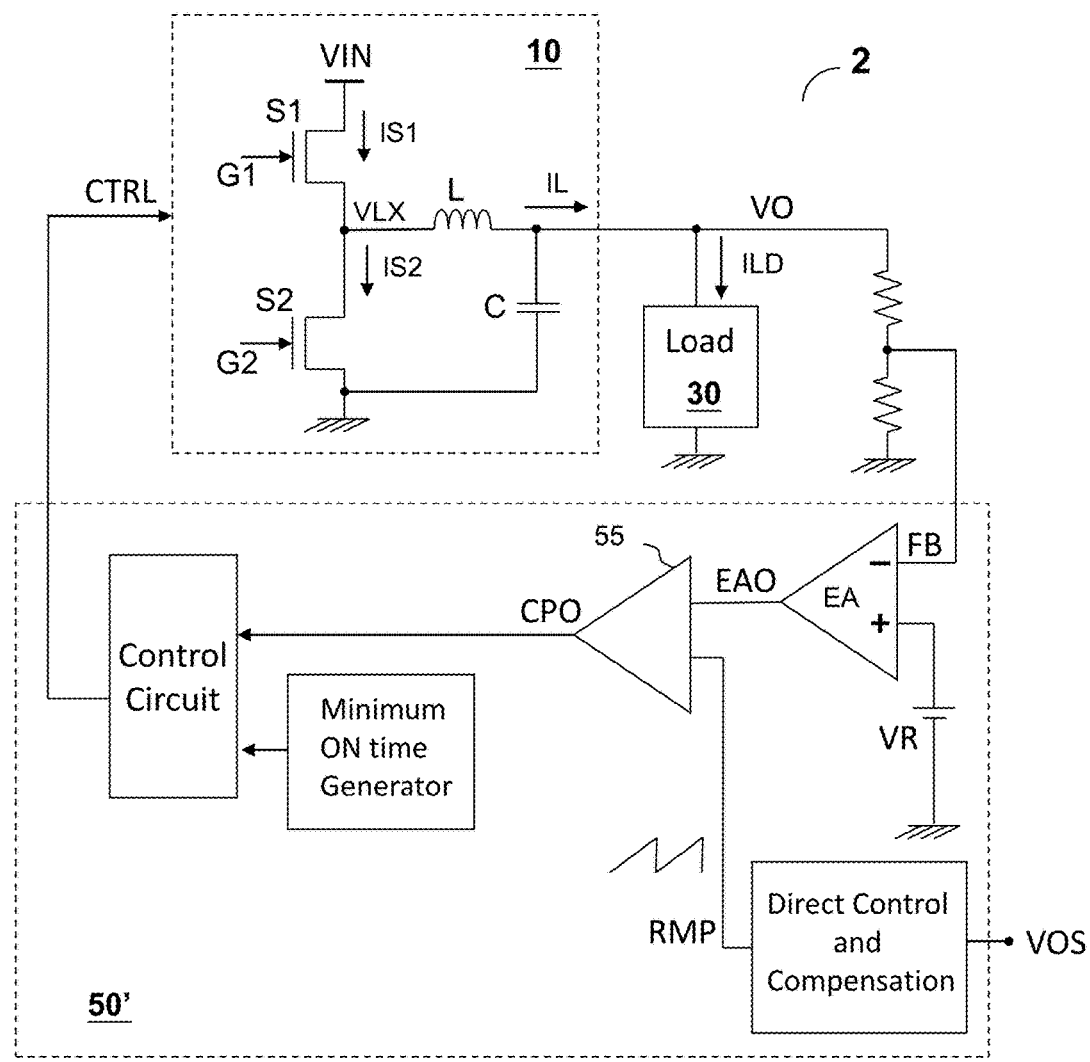
FIG. 2 shows a schematic diagram of a control circuit of another prior art constant time switching regulator.
Figure 3A:
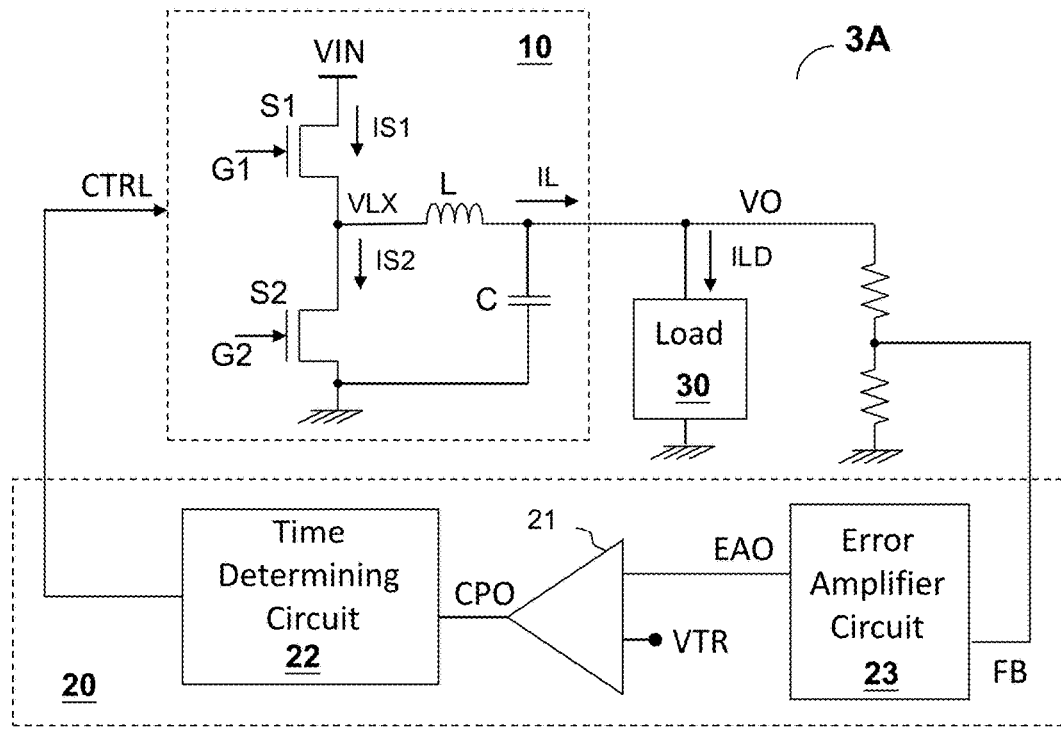
FIGS. 3A and 3B show schematic diagrams of two embodiments of the dual constant time switching regulators according to the present invention.

FIG. 3A shows an embodiment of a dual constant time switching regulator (switching regulator 3A) according to the present invention. The switching regulator 3A comprises a buck power circuit 10 and a switching control circuit 20. The buck power circuit 10 includes an inductor L and power switches S1 and S2, and is configured to operably convert the input voltage VIN to and output voltage VO.

The control circuit 20 generates a switch control signal CTRL (which for example includes G1 and G2) according to an output voltage related signal to control the power switches S1 and S2, wherein the output voltage related signal may be for example a feedback signal FB as shown in the figure or the output voltage itself. The switching control circuit 20 includes a comparison circuit 21 and a time determining circuit 22. The comparison circuit 21 compares a first input signal and a second input signal to generate a comparison result CPO. In this embodiment, the first input signal is a triangle wave signal VTR, and the second input signal is an error amplified signal EAO; the error amplified signal EAO relates to the output voltage related signal FB and may be generated by an error amplifier circuit 23, which will be described in detail later.

Figure 3B:
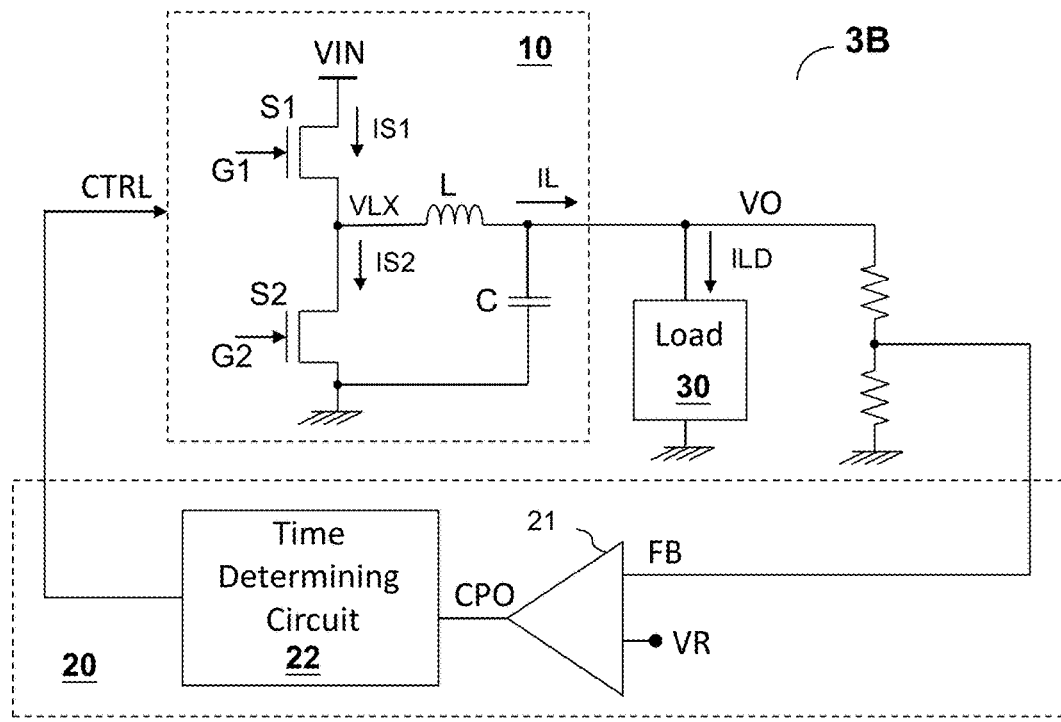

FIG. 3B shows another embodiment of a dual constant time switching regulator (switching regulator 3B) according to the present invention. This embodiment is similar to the switching regulator 3A, but is different in that in the switching regulator 3B, the first input signal is the output voltage related signal FB, and the second input signal is a reference voltage VR.

Still referring to FIGS. 3A and 3B, in the switching regulators 3A and 3B, the switching control circuit 20 includes the time determining circuit 22 which is configured to operably generate the switch control signal CTRL according to the comparison result CPO. Also please refer to FIGS. 4A and 4B which show schematic waveforms corresponding to the dual constant time switching regulators (for example the embodiments shown in FIGS. 3A, 3B, and 5A-5C) according to the present invention. As shown in the figures, when the power switch S1 is ON, the voltage VLX on the common node among the power switches S1 and S2 and the inductor L is VIN by the conduction of the power switch S1, and when the power switch S1 is OFF (S2 is ON), the voltage VLX on the common node is ground level by the conduction of the power switch S2 (S1 is OFF). The power switch S1 keeps ON for at least a minimum ON time TONmin after the power switch S1 is turned ON (for example T1 or T4 in FIG. 4A, or T5 or T8 in FIG. 4B), and after the minimum ON time TONmin finishes, the power switch S1 keeps ON until the level of the first input signal (for example the triangle wave signal VTR as shown in FIGS. 4A and 4B) is higher than the level of the second input signal (for example the error amplified signal EAO as shown in FIGS. 4A and 4B), and at this time point the power switch S1 is turned OFF (for example T2 in FIG. 4A or T7 in FIG. 4B).

Figure 4A:
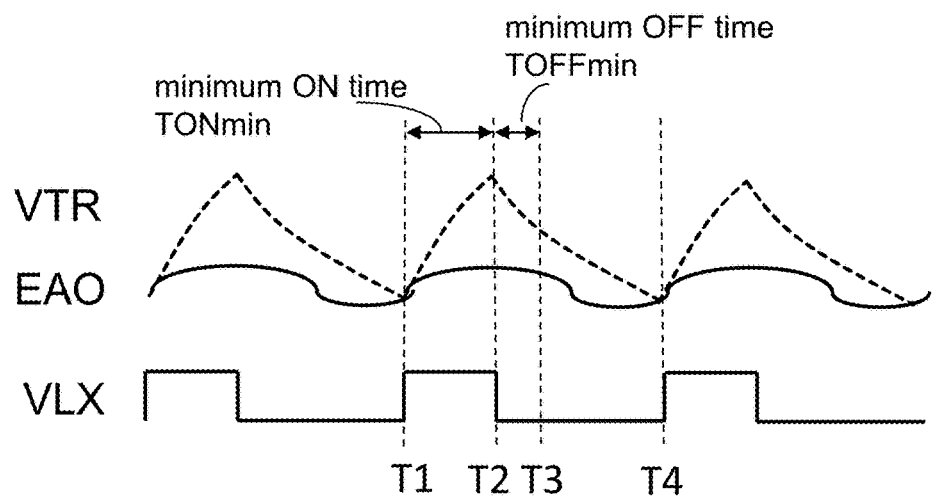
FIGS. 4A and 4B show schematic signal waveforms corresponding to the dual constant time switching regulators according to the present invention.

Taking FIG. 4A as an illustrative example, when the minimum ON time TONmin finishes (for example T2 in FIG. 4A), since the level of the first input signal (i.e. the triangle wave signal VTR) is already larger than the second input signal (i.e. the error amplified signal EAO), the power switch S1 is turned OFF right after the minimum ON time TONmin finishes (i.e. T2), that is, the switching regulator is operating in a constant ON time mode for the moment. And taking FIG. 4B as an illustrative example, when the minimum ON time TONmin finishes (for example T6 in FIG. 4B), since the level of the first input signal (i.e. the triangle wave signal VTR) is still lower than the second input signal (i.e. the error amplified signal EAO), the power switch S1 keeps ON after the minimum ON time TONmin finishes (i.e. T6) until when the level of the first input signal (i.e. the triangle wave signal VTR) is larger than the second input signal (i.e. the error amplified signal EAO), and then the power switch S1 is turned OFF (for example at the time point T7 in FIG. 4B).

Figure 4B:
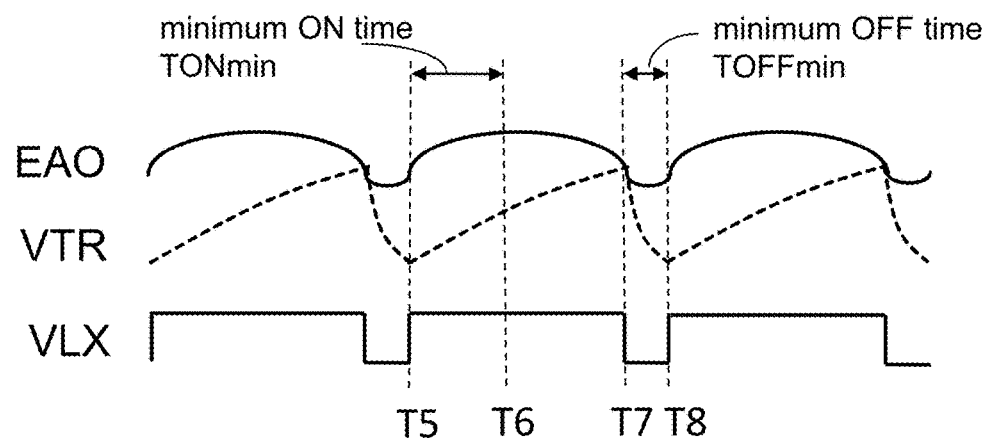

Still referring to FIGS. 4A and 4B, the power switch S1 keeps OFF for at least a minimum OFF time TOFFmin after the power switch S1 is turned OFF (for example T2 in FIG. 4A, or T7 in FIG. 4B), and after the minimum OFF time TOFFmin finishes (for example T3 in FIG. 4A, or T8 in FIG. 4B), the power switch S1 keeps OFF until the level of the first input signal (the triangle wave signal VTR) is lower than the level of the second input signal (the error amplified signal EAO), and at this time point the power switch S1 is turned ON.

Taking FIG. 4B as an illustrative example, when the minimum OFF time TOFFmin finishes (for example T8 in FIG. 4B), since the level of the first input signal (i.e. the triangle wave signal VTR) is already lower than the second input signal (i.e. the error amplified signal EAO), the power switch S1 is turned ON right after the minimum OFF time TOFFmin finishes (i.e. T8), that is, the switching regulator is operating in a constant OFF time mode for the moment. And taking FIG. 4A as an illustrative example, when the minimum OFF time TOFFmin finishes (for example T3 in FIG. 4A), since the level of the first input signal (i.e. the triangle wave signal VTR) is still higher than the second input signal (i.e. the error amplified signal EAO), the power switch S1 keeps OFF after the minimum OFF time TOFFmin finishes (i.e. T3) until when the level of the first input signal (i.e. the triangle wave signal VTR) is lower than the second input signal (i.e. the error amplified signal EAO), and then the power switch S1 is turned ON (for example at the time point T4 in FIG. 4A).

Note that typically the power switch S2 as shown in FIGS. 4A and 4B operates substantially in an opposite phase with the power switch S1 (i.e. the ON and OFF states of the power switches S1 and S2 are substantially complementary to each other, while there are dead time periods during which both power switches S1 and S2 are OFF). And in one embodiment, the power switch S2 can be replaced by other kinds of power devices suitable for buck switching operations, such as a power diode.

The operation of the embodiment in FIG. 3B and its signal waveforms are similar to those of the embodiments in FIGS. 4A and 4B, and hence are not redundantly explained here.

Figure 5A:
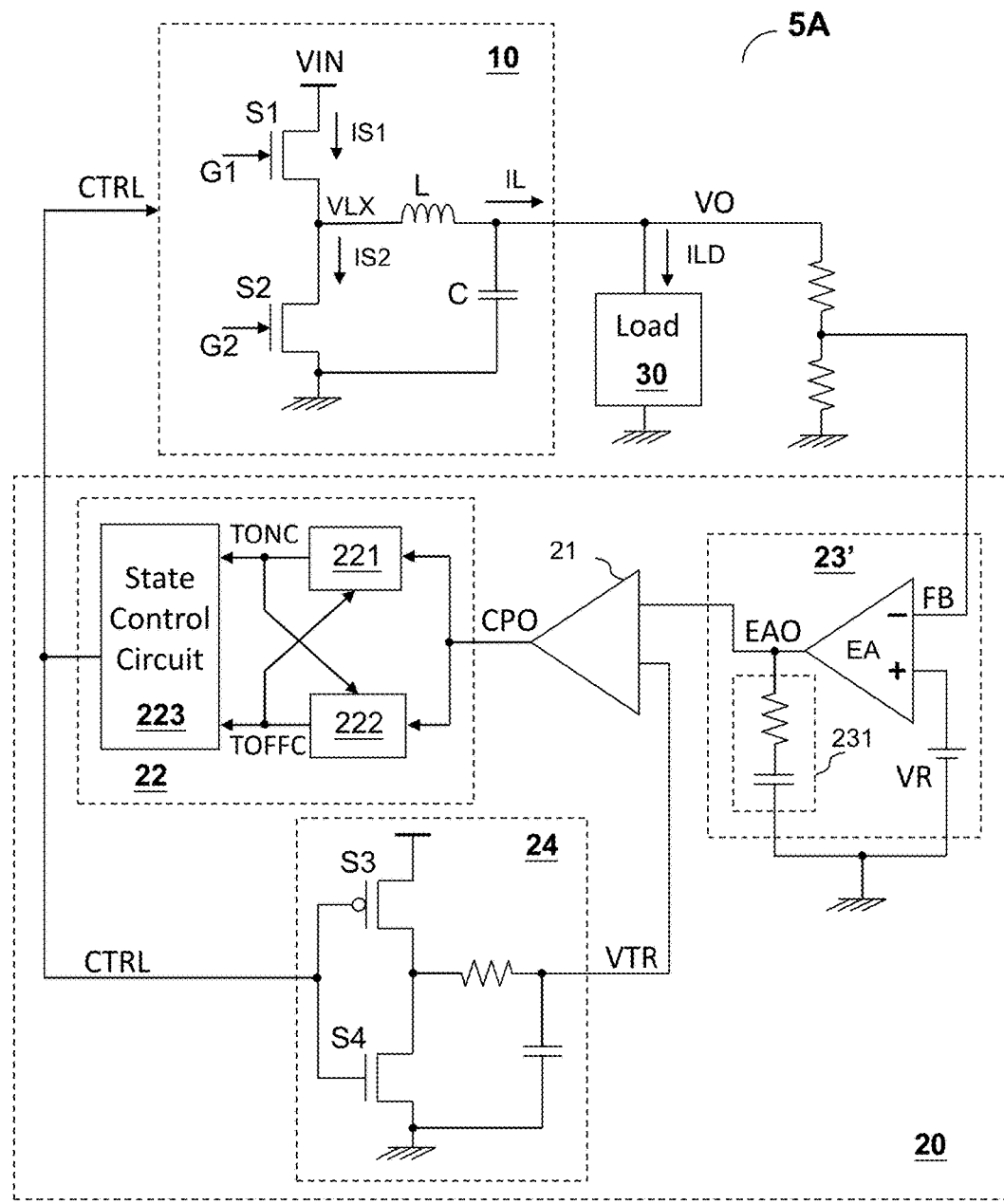
FIGS. 5A-5C show several embodiments of the dual constant time switching regulators according to the present invention.
Figure 5B:
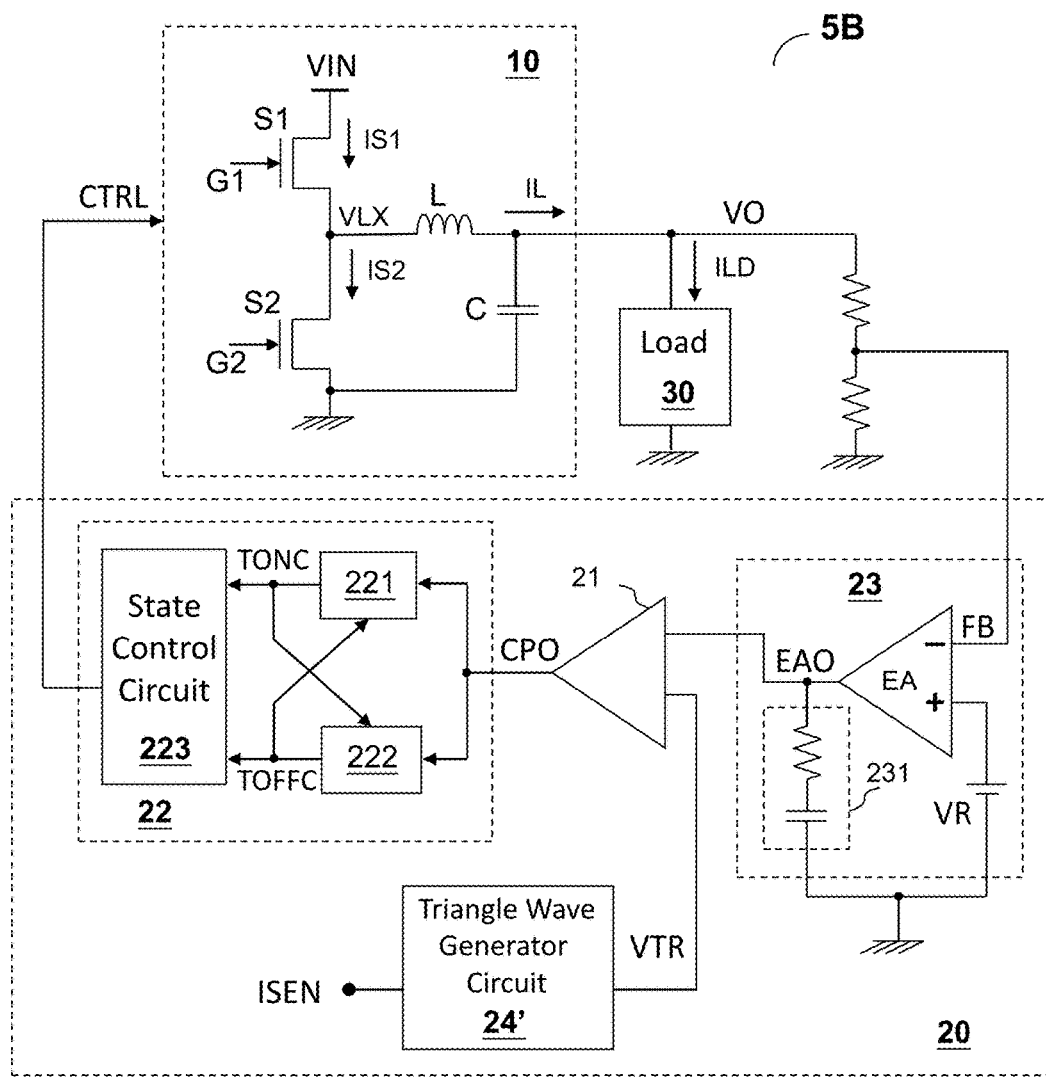
Figure 5C:
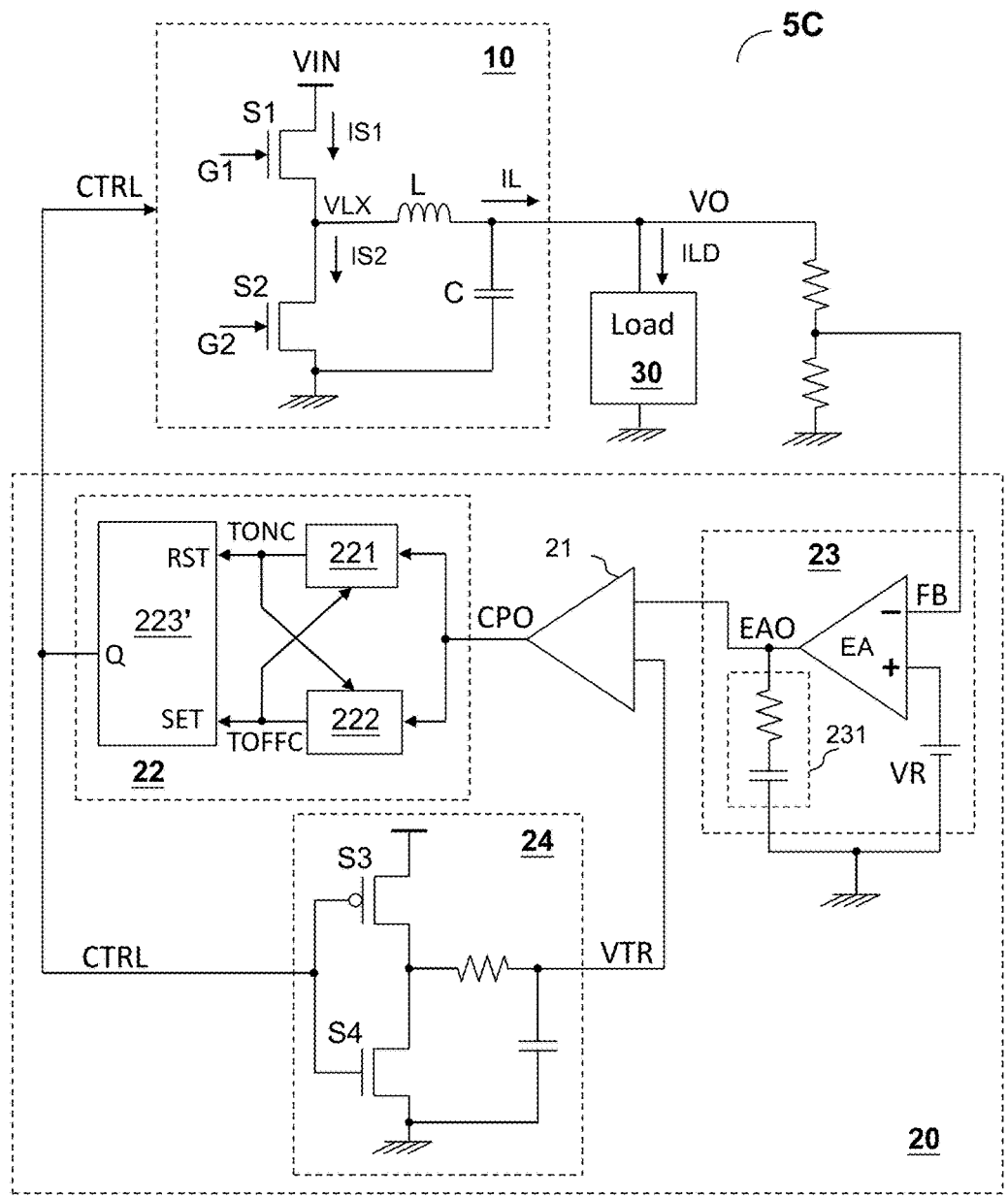

FIG. 5A shows a specific embodiment of a dual constant time switching regulator (switching regulator 5A) according to the present invention. In one embodiment as shown in the figure, the error amplifier circuit 23' may include an error amplifier EA which generates the error amplified signal EAO according to the output voltage related signal FB and the reference voltage VR. Note that in this embodiment, the error amplifier circuit 23' may further include a compensation circuit (for example but not limited to the compensation circuit 231 shown in the figure) which is related to loop control. And the present invention does not need an extra pin (such as the pin VOS in the prior art) for directly connecting to the output voltage VO, so the cost and the PCB space can be reduced.

Still referring to FIG. 5A, in one embodiment, the switching control circuit 20 may further include a triangle wave generator circuit 24 which is configured to operably generate the triangle wave signal VTR. In one embodiment, the triangle wave generator circuit 24 generates the triangle wave signal VTR according to the switch control signal CTRL. In one embodiment, as shown in FIG. 5A, the triangle wave signal VTR is generated by a charging circuit which includes a resistor, a capacitor and charging switches (such as S3 and S4 in FIG. 5A) controlled by the switch control signal CTRL. In another embodiment (for example the switching regulator 5B shown in FIG. 5B), the triangle wave generator circuit 24' generates the triangle wave signal VTR according to an output current related signal ISEN, wherein the output current related signal ISEN may be obtained according to an inductor current IL through the inductor L or currents IS1 or IS2 through the power switches S1 and S2. In yet another embodiment, the triangle wave signal VTR is generated according to the switch control signal CTRL and the output current related signal ISEN.

Note that in one embodiment, the triangle wave signal VTR is a full triangle wave. The term "full triangle wave" indicates a triangle wave which has a non-zero slope when the power switch is either ON or OFF. From another perspective, the full triangle wave signal VTR is neither a leading triangle wave signal (which only has an ascending side but no descending side) nor a trailing triangle wave signal (which only has a descending side but no ascending side).

Still referring to FIG. 5A, the time determining circuit 22 includes a minimum ON time generator circuit 221, a minimum OFF time generator circuit 222, and a state control circuit 223. The minimum ON time generator circuit 221 generates a minimum ON control signal TONC according to the comparison result CPO and a minimum OFF control signal TOFFC to determine the minimum ON time TONmin. The minimum OFF time generator circuit 222 generates a minimum OFF control signal TOFFC according to the comparison result CPO and the minimum ON control signal TONC to determine the minimum OFF time TOFFmin. The state control circuit 223 generates the switch control signal CTRL according to the minimum ON control signal TONC and the minimum OFF control signal TOFFC. In one embodiment, the state control circuit 223 may be for example but not limited to a latch circuit (for example the latch circuit 223' in FIG. 5C), wherein the minimum ON control signal TONC and the minimum OFF control signal TOFFC are connected to a reset terminal RST and a set terminal SET of the latch circuit 223' respectively, and the switch control signal is generated by the latch circuit 223' through an output terminal Q to achieve the aforementioned operation control.

Figure 6:
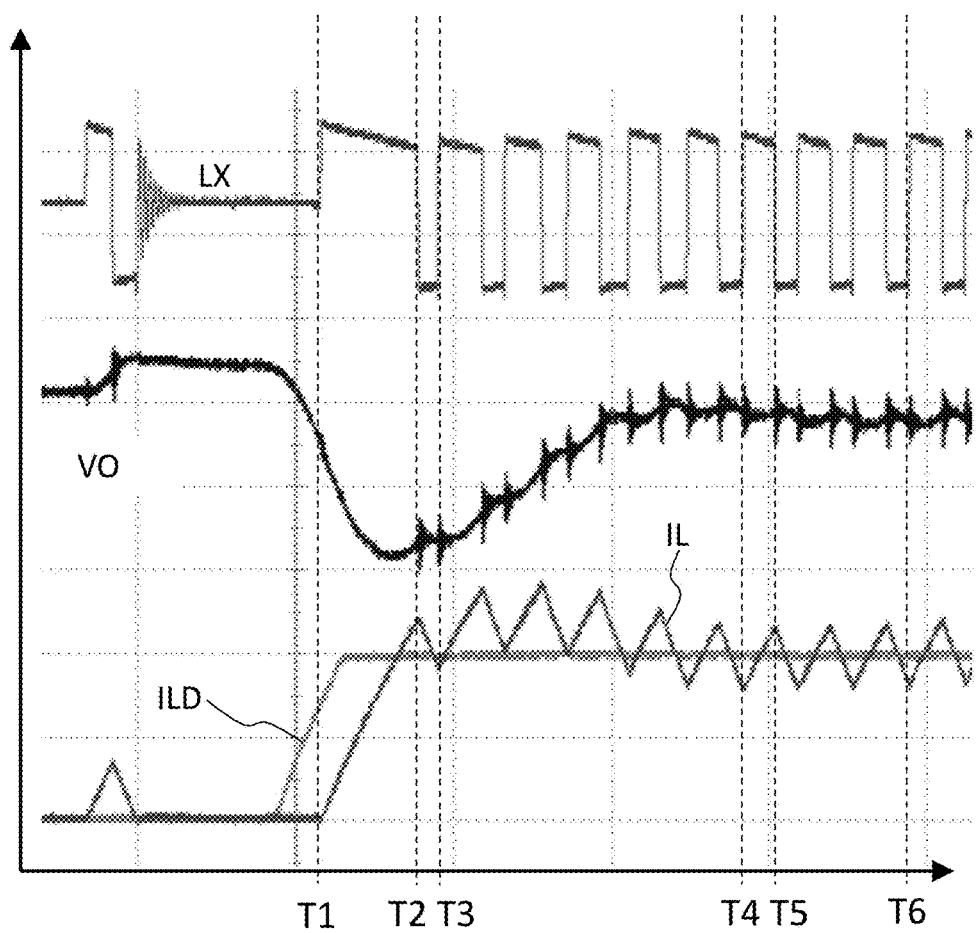
FIG. 6 shows signal waveforms corresponding to the dual constant time switching regulators according to the present invention.

Note that by the operation principles described herein, the present invention can automatically and seamlessly switch between the constant ON time mode and the constant OFF time mode. FIG. 6 shows measured signal waveforms of the load transient response corresponding to the dual constant time switching regulators of the present invention (such as switching regulators 3A, 3B, 5A-5C) The power switch (e.g. S1 in the aforementioned switching regulators) has a constant ON time (i.e. TONmin, e.g. T4-T5) when operating in steady state (for example T4-T6 in FIG. 6), that is, the switching regulator is operating in the constant ON time mode in steady state. However during the load transient period, the ON time of the power switch can be extended automatically (for example T1-T2 in FIG. 6), and in this period, the switching regulator of the present invention can switch to the constant OFF time mode automatically and seamlessly, wherein the constant OFF time is TOFFmin (e.g. T2-T3 in FIG. 6). The load response of the output voltage is hence improved by the automatic extension of the ON time of the power switch.

Figure 7:
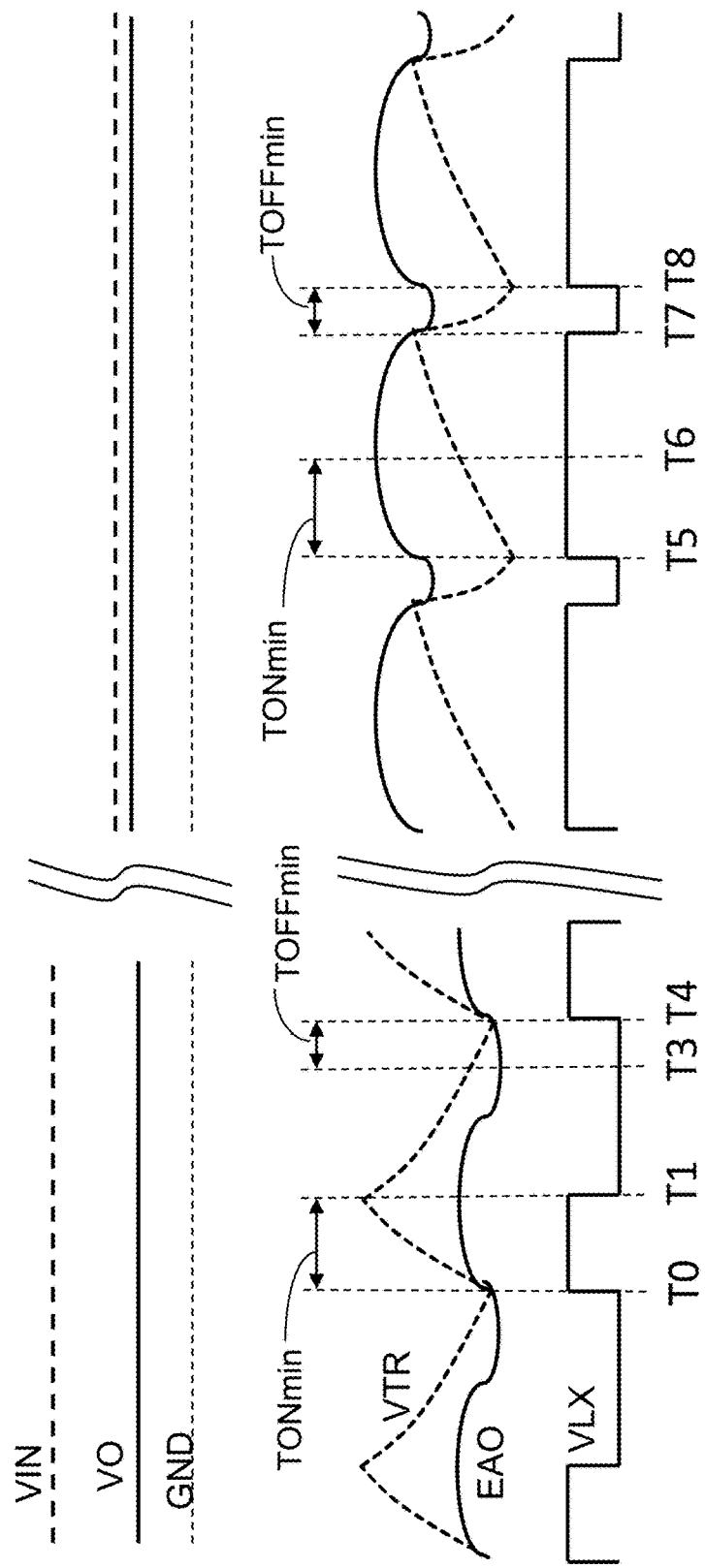
FIG. 7 shows signal waveforms corresponding to the dual constant time switching regulators according to the present invention.

FIG. 7 shows measured signal waveforms of the line (i.e., power input line) transient response corresponding to the dual constant time switching regulators of the present invention (such as switching regulators 3A, 3B, 5A-5C). The power switch (e.g. S1 in the aforementioned switching regulators) has a constant ON time (i.e. TONmin) when the input voltage VIN is higher than the output voltage VO (for example T0-T4 in FIG. 7), that is, the switching regulator is operating in the constant ON time mode in this state. However, when the input voltage VIN is getting close to the output voltage VO (for example T5-T8 in FIG. 7), since a larger duty cycle is required, the ON time of the power switch can be extended automatically (for example T5-T7 in FIG. 7), and in this period, the switching regulator of the present invention can switch to the constant OFF time mode automatically and seamlessly, wherein the constant OFF time is TOFFmin (e.g. T7-T8 in FIG. 7). In one embodiment, the switching frequency of the switching regulator is also lowered accordingly. Note that when the ratio of the output voltage VO and the input voltage VIN is at a boundary value, both the ON time and the OFF time of the power switch will be constant, i.e. TONmin and TOFFmin respectively. Since the ON time of the power switch can be extended automatically, the duty cycle of the switching regulator of the present invention can reach as high as close to 100%, and therefore the switching regulator of the present invention can operate with a wider input voltage range than the prior art.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, those skilled in this art can readily conceive variations and modifications within the spirit of the present invention. For example, the present invention is illustrated by embodiments of buck switching regulators hereinbefore, however, according to the spirit of the present invention, other switching regulators that can operate with constant ON time and constant OFF time modulations can achieve similar functions according to the teaching of the present invention. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A dual constant time switching regulator, comprising:
a power circuit, which includes an inductor and at least a power switch, configured to operably convert an input voltage to an output voltage; and
a switching control circuit, configured to operably generate a switch control signal according to a signal related to the output voltage (an output voltage related signal) to control the power switch, including:
a comparison circuit, configured to operably compare a first input signal and a second input signal to generate a comparison result, wherein the first input signal and the second input signal are one of the following combinations: (1) the first input signal is a triangle wave signal, and the second input signal is an error amplified signal; or (2) the first input signal is the output voltage related signal, and the second input signal is a reference voltage; and
a time determining circuit, configured to operably generate the switch control signal according to the comparison result, wherein the power switch keeps ON for at least a minimum ON time after the power switch is turned ON, and after the minimum ON time finishes, the power switch keeps ON until a level of the first input signal is higher than a level of the second input signal, and at this time point the power switch is turned OFF, wherein the power switch keeps OFF for at least a minimum OFF time after the power switch is turned OFF, and after the minimum OFF time finishes, the power switch keeps OFF until the level of the first input signal is lower than the level of the second input signal, and at this time point the power switch is turned ON.

2. The dual constant time switching regulator of claim 1, wherein the time determining circuit includes:
   a minimum ON time generator circuit, configured to operably generate a minimum ON control signal according to the comparison result and a minimum OFF control signal, wherein the minimum ON control signal determines the minimum ON time;
   a minimum OFF time generator circuit, configured to operably generate a minimum OFF control signal according to the comparison result and the minimum ON control signal, wherein the minimum OFF control signal determines the minimum OFF time; and
   a state control circuit, configured to operably generate the switch control signal according to the minimum ON control signal and the minimum OFF control signal.

3. The dual constant time switching regulator of claim 1, wherein the switching control circuit further includes:
   a triangle wave generator circuit, configured to operably generate the triangle wave signal; and
   an error amplifier circuit, configured to operably generate the error amplified signal according to a difference of the output voltage related signal and a reference voltage.

4. The dual constant time switching regulator of claim 1, wherein the triangle wave signal is a full triangle wave.

5. The dual constant time switching regulator of claim 3, wherein the triangle wave generator circuit generates the triangle wave signal according to the switch control signal and/or an output current related signal.

6. A switching control circuit, configured to operably control a dual constant time switching regulator, wherein the dual constant time switching regulator comprises a power circuit and the switching control circuit, the power circuit including an inductor and at least a power switch and is configured to operably convert an input voltage to an output voltage; the switching control circuit being configured to operably generate a switch control signal according to a signal related to the output voltage (an output voltage related signal) to control the power switch, and the switching control circuit including:
   a comparison circuit, configured to operably compare a first input signal and a second input signal to generate a comparison result, wherein the first input signal and the second input signal are one of the following combinations: (1) the first input signal is a triangle wave signal, and the second input signal is an error amplified signal; or (2) the first input signal is the output voltage related signal, and the second input signal is a reference voltage; and
   a time determining circuit, configured to operably generate the switch control signal according to the comparison result, wherein the power switch keeps ON for at least a minimum ON time after the power switch is turned ON, and after the minimum ON time finishes, the power switch keeps ON until the level of the first input signal is higher than the level of the second input signal, and at this time point the power switch is turned OFF, wherein the power switch keeps OFF for at least a minimum OFF time after the power switch is turned OFF, and after the minimum OFF time finishes, the power switch keeps OFF until the level of the first input signal is lower than the level of the second input signal, and at this time point the power switch is turned ON.

7. The switching control circuit of claim 6, wherein the time determining circuit includes:
   a minimum ON time generator circuit, configured to operably generate a minimum ON control signal according to the comparison result and a minimum OFF control signal, wherein the minimum ON control signal determines the minimum ON time;
   a minimum OFF time generator circuit, configured to operably generate a minimum OFF control signal according to the comparison result and the minimum ON control signal, wherein the minimum OFF control signal determines the minimum OFF time; and
   a state control circuit, configured to operably generate the switch control signal according to the minimum ON control signal and the minimum OFF control signal.

8. The switching control circuit of claim 6, further including:
   a triangle wave generator circuit, configured to operably generate the triangle wave signal; and
   an error amplifier circuit, configured to operably generate the error amplified signal according to a difference of the output voltage related signal and a reference voltage.

9. The switching control circuit of claim 6, wherein the triangle wave signal is a full triangle wave.

10. The switching control circuit of claim 8, wherein the triangle wave generator circuit generates the triangle wave signal according to the switch control signal and/or an output current related signal.

11. A method for controlling a dual constant time switching regulator, wherein the dual constant time switching regulator comprises a power circuit which includes an inductor and at least a power switch and is configured to operably convert an input voltage to an output voltage; the method including:
   comparing a first input signal and a second input signal to generate a comparison result, wherein the first input signal and the second input signal are one of the following combinations: (1) the first input signal is a triangle wave signal, and the second input signal is an error amplified signal; or (2) the first input signal is the output voltage related signal, and the second input signal is a reference voltage; and
   generating a switch control signal according to the comparison result to control the power switch, wherein the power switch keeps ON for at least a minimum ON time after the power switch is turned ON, and after the minimum ON time finishes, the power switch keeps ON until the level of the first input signal is higher than the level of the second input signal, and at this time point the power switch is turned OFF, wherein the power switch keeps OFF for at least a minimum OFF time after the power switch is turned OFF, and after the minimum OFF time finishes, the power switch keeps OFF until the level of the first input signal is lower than the level of the second input signal, and at this time point the power switch is turned ON.

12. The method of claim 11, wherein the triangle wave signal substantially is a full triangle wave.

13. The method of claim 11, wherein the step of generating the triangle wave includes: generating the triangle wave signal according to the switch control signal and/or an output current related signal.

* * * * *